(12) United States Patent
Oshima (10) Patent No.: US 7,753,365 B2
(45) Date of Patent: Jul. 13, 2010

(54) IMAGE SCANNING APPARATUS AND IMAGE SCANNER

(75) Inventor: Osamu Oshima, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 239 days.

(21) Appl. No.: 12/031,742

(22) Filed: Feb. 15, 2008

(65) Prior Publication Data

US 2008/0224391 A1 Sep. 18, 2008

(30) Foreign Application Priority Data

Mar. 15, 2007 (JP) ............................. 2007-067346

(51) Int. Cl.
*B65H 1/18* (2006.01)
(52) U.S. Cl. ..................... 271/152; 271/155; 271/153; 271/154; 271/156
(58) Field of Classification Search ......... 271/152–156, 271/147, 162
See application file for complete search history.

(56) References Cited

U.S. PATENT DOCUMENTS

| 5,295,678 A | | 3/1994 | Lindner et al. | |
| 5,397,118 A | * | 3/1995 | Iida et al. | 271/155 |
| 5,556,252 A | * | 9/1996 | Kuster | 414/796.7 |

FOREIGN PATENT DOCUMENTS

| JP | 62-111832 A | 5/1987 |
| JP | 08-002702 A | 1/1996 |
| JP | 11-091955 A | 4/1999 |
| JP | 2006-016093 A | 1/2006 |
| JP | 2006-044901 A | 2/2006 |

OTHER PUBLICATIONS

Official communication issued in counterpart Japanese Application No. 2007-067346, mailed on Feb. 17, 2009.
Official Communication issued in corresponding European Patent Application No. 08001439.2, mailed on Aug. 10, 2009.
Oshima; "Image Scanning Apparatus and Image Scanner"; U.S. Appl. No. 12/018,862, filed Jan. 24, 2008.
Oshima; "Image Scanning Apparatus and Image Scanner," U.S. Appl. No. 12/043,216, filed Mar. 6, 2008.

* cited by examiner

*Primary Examiner*—Saúl J Rodríguez
*Assistant Examiner*—Luis Gonzalez
(74) *Attorney, Agent, or Firm*—Keating & Bennett, LLP (57) ABSTRACT

In an image scanning apparatus, when documents on a document tray are sequentially transferred, different control steps are performed according to a scanning speed when an upper surface height of the documents is lowered thereby turning off a height detection sensor. In a first control mode, which is not a high speed scanning, the document tray is elevated little by little during an inter-transfer time between each time one document is transferred until the upper surface height reaches a target height that is higher by a predetermined distance since the height detection sensor is turned on. In a second control mode, in which high speed scanning is performed, the document tray is elevated little by little during the inter-transfer time each time the one document is transferred until the upper surface height reaches a height that is higher by a predetermined distance than a height at a time when the height detection sensor is turned off.

7 Claims, 8 Drawing Sheets

IMAGE SCANNING APPARATUS AND IMAGE SCANNER

CROSS-REFERENCE TO RELATED APPLICATIONS

This application claims priority under 35 U.S.C. 119 to Japanese Patent Application No. 2007-67346, filed on Mar. 15, 2007, which application is hereby incorporated by reference in its entirety.

BACKGROUND OF THE INVENTION

1. Field of the Invention

The present invention relates to a configuration of an image scanning apparatus suitably used to place and scan a large amount of documents.

2. Description of the Related Art

For example, Japanese patent Laid-Open application publication No. 2006-16093 discloses a copying machine which includes an upper limit position detection sensor for detecting a topmost document while being able to accommodate plural documents on a document tray (document feeder tray). In the copying machine disclosed in Japanese patent Laid-Open application publication No. 2006-16093, when the number of documents is decreased as the documents on the document tray are fed, a control device controls a tray driving mechanism to always keep the topmost document at the same position with respect to a pickup roller according to a detection result of the upper limit position detection sensor. Therefore, the topmost document is always located at a position where the document can be fed.

In the large capacity image scanning apparatus as disclosed in Japanese patent Laid-Open application publication No. 2006-16093, with the increasing need for fast copying of a large amount of documents, there is a strong demand to perform high speed scanning while maintaining the scanning image quality.

However, in Japanese patent Laid-Open application publication No. 2006-16093, there is no description concerning the timing for controlling the tray driving mechanism to lift and lower the document tray. Accordingly, in Japanese patent Laid-Open application publication No. 2006-16093, when the document tray is elevated during scanning of the document, the document is possibly moved by an elevation of the document tray during transportation of the document, resulting in deterioration of the scanning image quality.

In the configuration disclosed in Japanese Patent Laid-Open application publication No. 2006-16093, when a scanning speed of the document is increased, vibration becomes significant in conveying the document, which results in a considerable variation in the detection result of the upper limit position detection sensor. Accordingly, the top most document is often not positioned with high accuracy to frequently generate a document transfer error.

SUMMARY OF THE INVENTION

In order to overcome the problems described above, preferred embodiments of the present invention provide a document tray elevation control suitable for high speed scanning while preventing the deterioration of the scanning image quality.

Preferred embodiments of the present invention for overcoming problems described above will be described below.

A preferred embodiment of the present invention provides an image scanning apparatus including a document tray arranged to accommodate a plurality of documents with the documents overlapped, an image scanning unit arranged to scan the documents, a transfer unit arranged to transfer the documents on the document tray one by one toward the image scanning unit, a lifting and lowering device arranged to lift and lower the document tray, a height detection sensor arranged to detect an upper surface height of the documents stacked on the document tray, and a control unit arranged to control the lifting and lowering device. The control unit can control the lifting and lowering device while switching between a first control mode and a second control mode in which a document scanning speed is faster than that of the first control mode. In the first control mode, when the height detection sensor detects that the upper surface height becomes lower than a predetermined height due to the transfer of the document by the transfer unit, and until the upper surface height reaches a target height that is higher by a predetermined distance than when the height detection sensor initially detects that the upper surface height becomes higher than a predetermined height, the control unit elevates the document tray at predetermined pitches each time the one document is transferred during an inter-transfer time until the transfer of the next document is started since the transfer of the document is completed. In the second control mode, until the upper surface height reaches a height that is higher by a predetermined distance than a height at a time when the height detection sensor detects that the upper surface height becomes lower than a predetermined height, the control unit elevates the document tray at predetermined pitches during the inter-transfer time each time the one document is transferred.

Therefore, in both the first control mode and the second control mode, the document tray is elevated during the inter-transfer time between the completion of the transfer of the document to the start of the transfer of the subsequent document. Accordingly, when the image is scanned with the image scanning unit, the document tray is kept stationary to prevent the deterioration of the scanning image quality caused by the fluctuation in document transportation. In both the first control mode and the second control mode, the document tray is not elevated all at once, but the document tray is elevated at relatively short predetermined pitches (little by little), so that the document tray can naturally be elevated during the short inter-transfer time without interrupting the transfer of the document. In the second control mode in which the document is scanned at a high speed, the document tray is elevated by the predetermined distance irrespective of the state of the height detection sensor in elevating the document tray, so that the upper surface height of the topmost document can stably be elevated to a proper height for pick-up with no influence of the error detection of the height detection sensor, which is caused by the vibrations associated with the high speed scanning.

In the image scanning apparatus, preferably the control unit can control the lifting and lowering device in a third control mode in which the document scanning speed is slower than that of the first control mode. In the third control mode, when the height detection sensor detects that the upper surface height becomes lower than the predetermined height due to the transfer by the document of the transfer unit, the control unit elevates the document tray during the inter-transfer time until the upper surface height of the document reaches the target height.

Therefore, in the low speed scanning of the document, the upper surface height of the document can accurately be elevated to the suitable height based on a detection result of the height detection sensor. Because the document tray is elevated one time by utilizing the inter-transfer time, it is not necessary to interrupt the scanning of the document, and the scanning efficiency is improved.

In the image scanning apparatus, preferably, when the height detection sensor detects that the upper surface height becomes lower than the predetermined height due to the transfer of the document by the transfer unit, in the first control mode, the control unit elevates the document tray at predetermined pitches during the inter-transfer time each time the one document is transferred until the height detection sensor detects that the upper surface height becomes not lower than the predetermined height. When the height detection sensor detects that the upper surface height becomes not lower than the predetermined height, the control unit elevates the document tray at predetermined pitches during the inter-transfer time each time the one document is transferred until the upper surface height is further elevated by a predetermined target elevating distance. A determination as to whether or not the upper surface height is elevated by the target elevating distance is made in consideration of a decrease in the upper surface height due to the transfer of the document.

Therefore, because the decrease in the upper surface height due to the transfer of the document is considered in the determination as to whether or not the upper surface height is elevated by the target elevating distance in the first control mode, the topmost document can substantially be elevated to the proper height, even if the document tray is elevated little by little each time the document is transferred.

In the image scanning apparatus, preferably, when the height detection sensor detects that the upper surface height becomes lower than the predetermined height due to the transfer of the document of the transfer unit, in the second control mode, the control unit elevates the document tray at predetermined pitches during the inter-transfer time each time the one document is transferred until the upper surface height is elevated by a predetermined necessary elevating distance. A determination as to whether or not the upper surface height is elevated by the necessary elevating distance is made in consideration of a decrease in the upper surface height due to the transfer of the document.

Therefore, because the decrease in the upper surface height due to the transfer of the document is considered in the determination as to whether or not the upper surface height is elevated by the necessary elevating distance, the topmost document can substantially be elevated to the proper height, even if the document tray is elevated little by little each time the document is transferred.

In the image scanning apparatus, preferably the predetermined pitch in at least one of the first control mode and the second control mode is shortened as a transfer speed of the document of the transfer unit is increased.

Therefore, even if the document scanning speed is increased to shorten the inter-transfer time, the predetermined pitch is also shortened as the inter-transfer time is shortened, so that the document tray can naturally be elevated little by little during the inter-transfer time.

In the image scanning apparatus, preferably a driving source is shared by the lifting and lowering device and a document transportation device arranged to transport the document to the image scanning unit.

Therefore, the configuration can be simplified to realize cost reduction, weight reduction, and downsizing of the image scanner. Because the document tray is elevated during the inter-transfer time, a power transmission destination of the one driving source can be switched between the time of the transfer of the document and the time of the elevation of the document tray, which allows a proper balance to be achieved between the transfer of the document and the elevation of the document tray.

In accordance with another preferred embodiment of the invention, an image scanner is provided as the image scanning apparatus.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
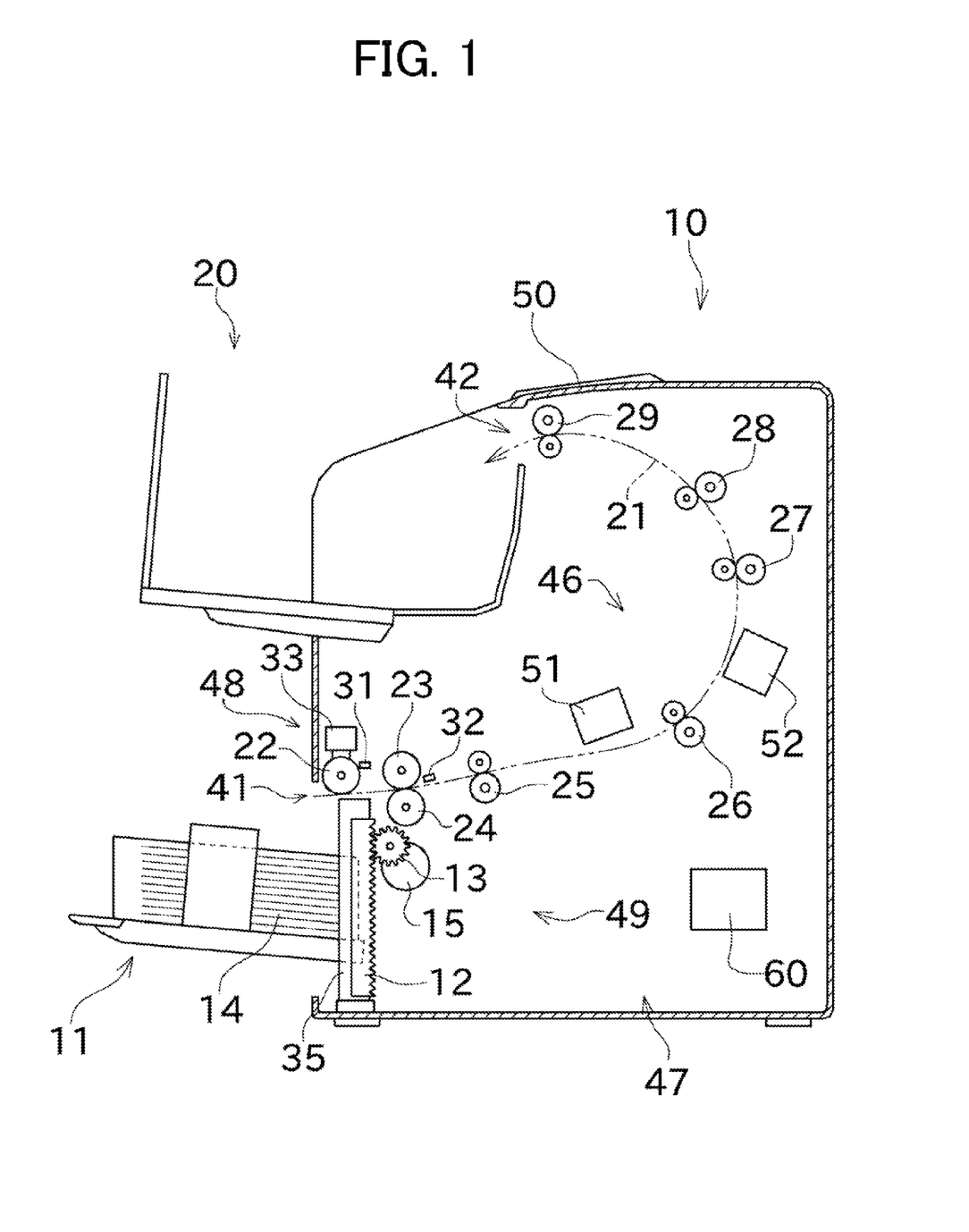
FIG. 1 is a sectional side view illustrating an entire configuration of an image scanner according to a preferred embodiment of the present invention.
Figure 2:
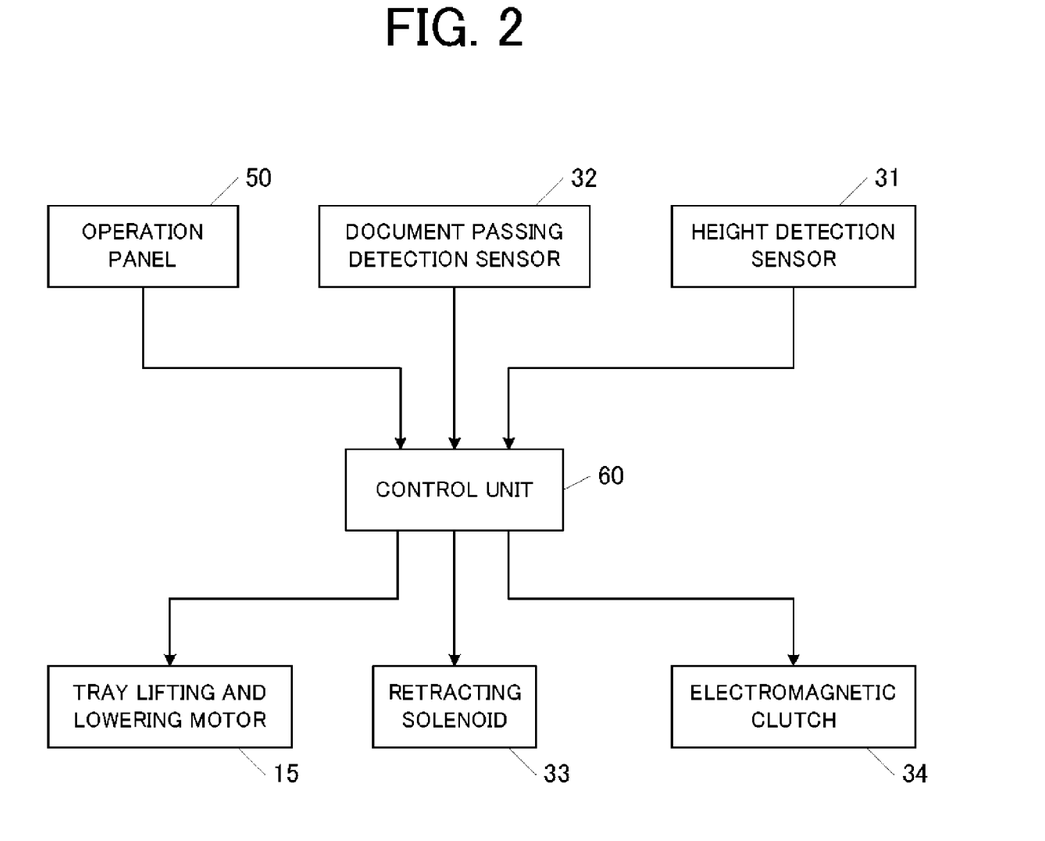
FIG. 2 is a block diagram illustrating a portion of an electronic configuration of the image scanner.
Figure 3:
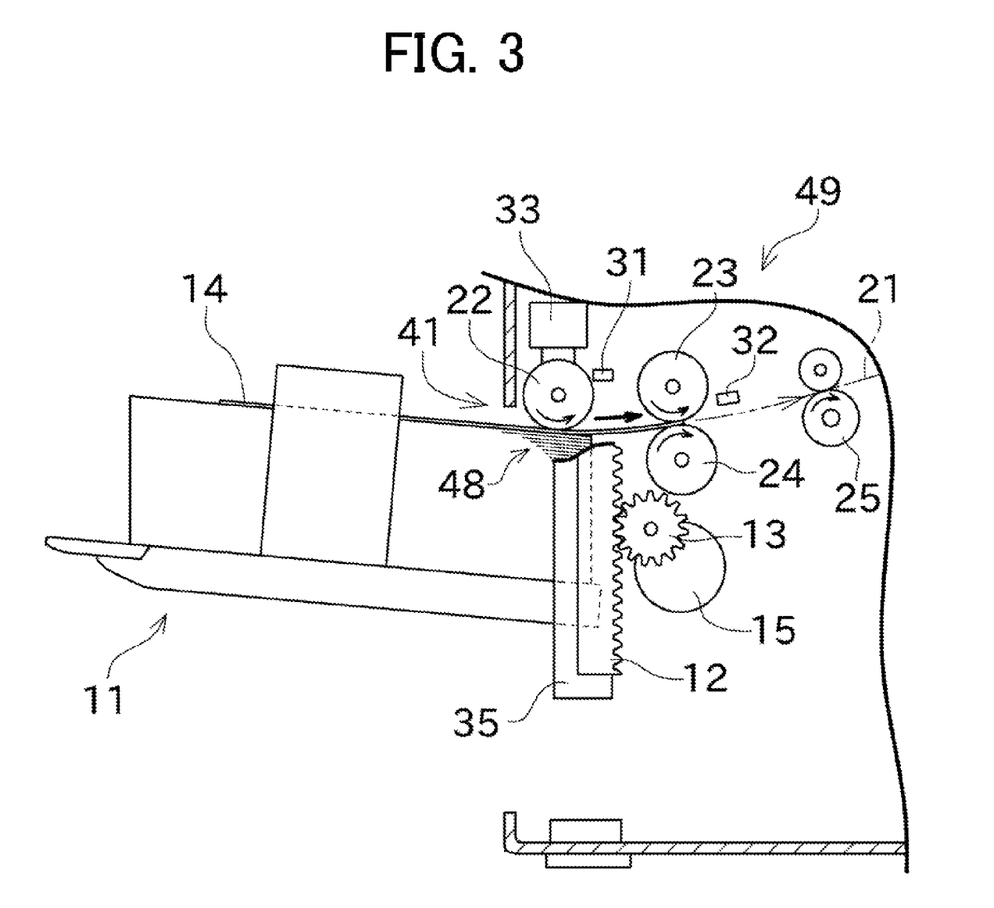
FIG. 3 is an enlarged sectional side view illustrating a state in which a transfer unit is driven to transfer a topmost document into a document transportation path.
Figure 4:
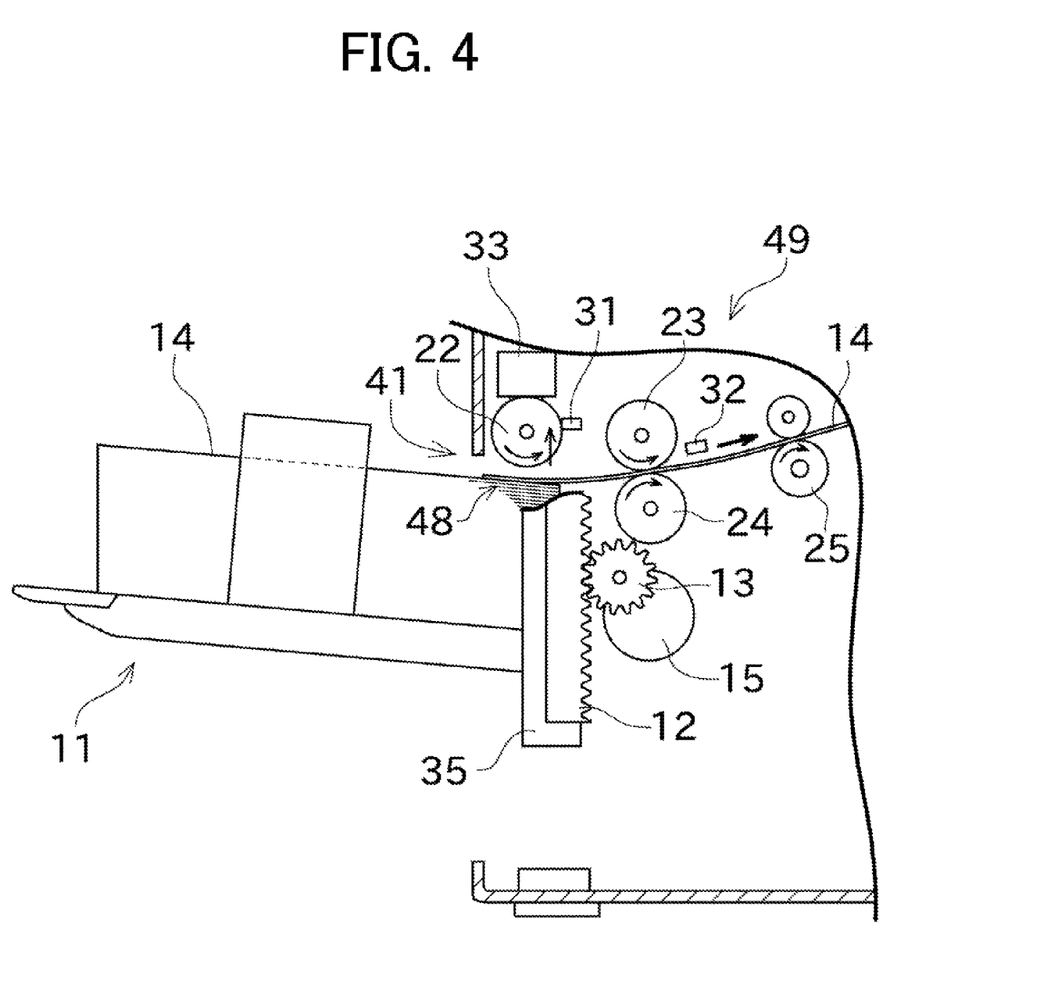
FIG. 4 is an enlarged sectional side view illustrating a state in which a pickup roller is retracted upward immediately before the transfer of the topmost document is completed.
Figure 5:
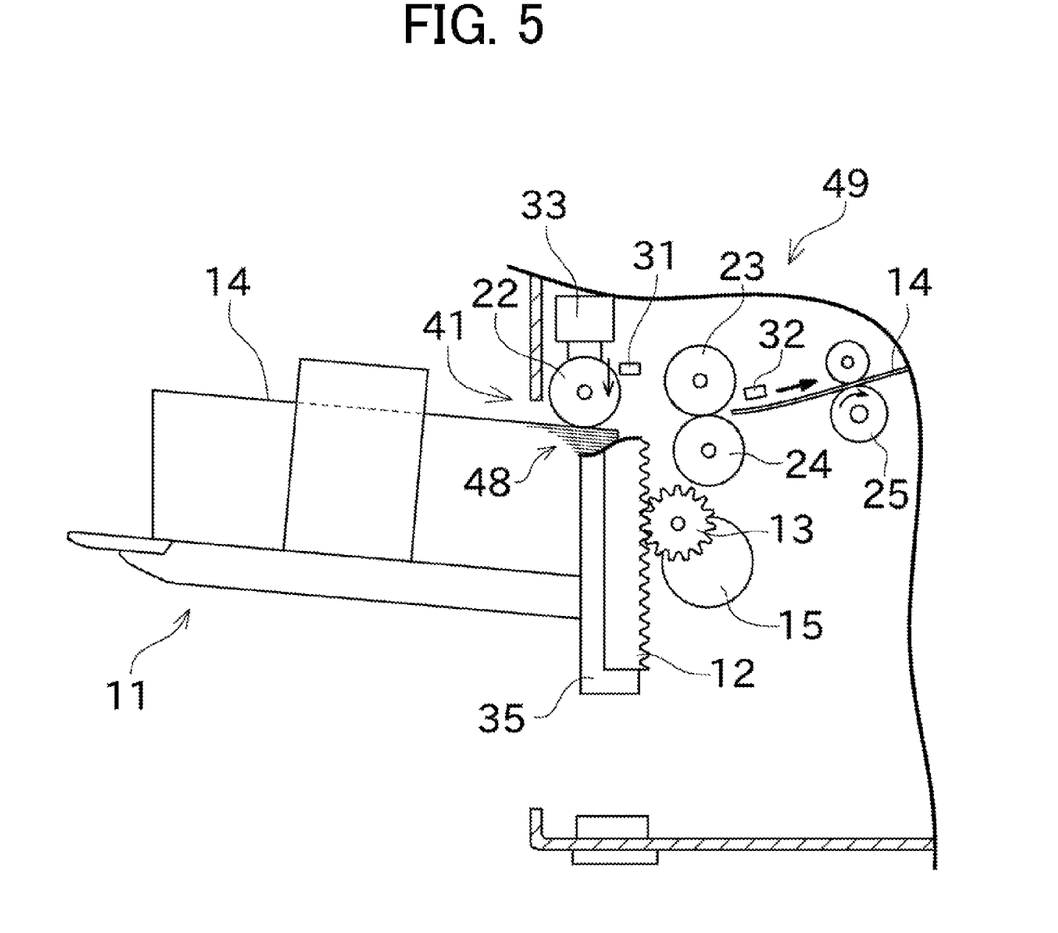
FIG. 5 is an enlarged sectional side view illustrating a state in which the transfer is completed to lower the pickup roller again.
Figure 6:
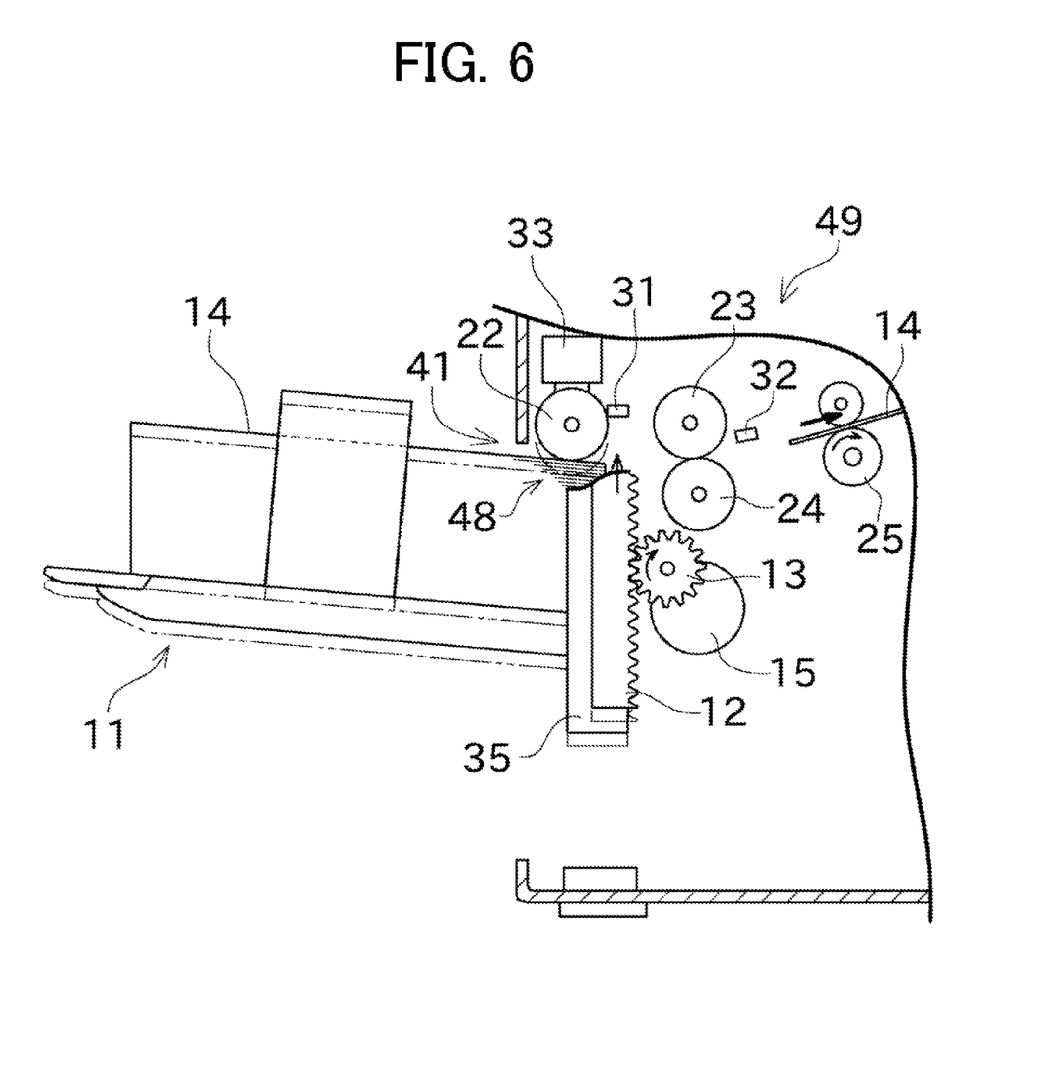
FIG. 6 is an enlarged sectional side view illustrating a state in which a document tray is elevated.
Figure 7:
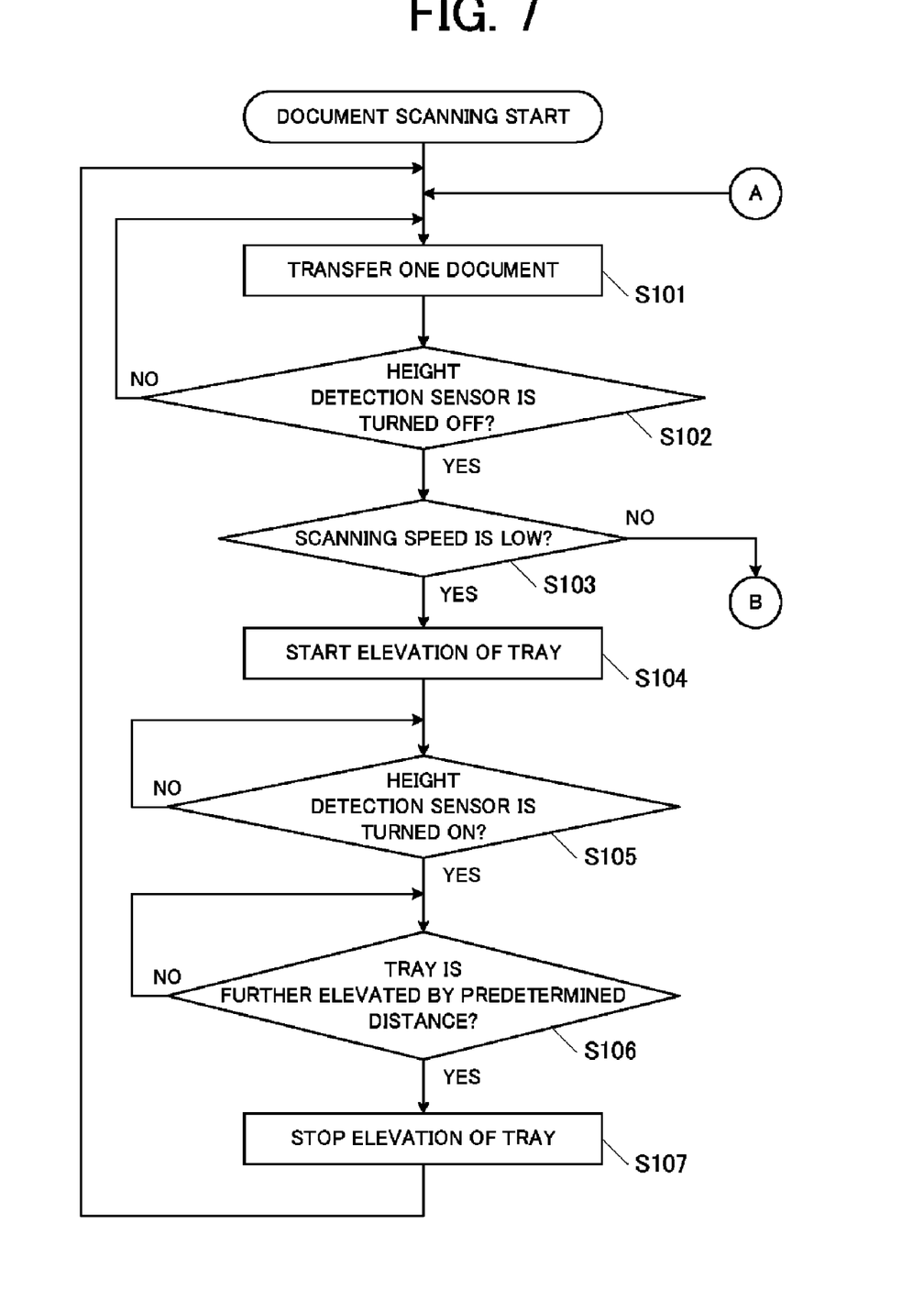
FIG. 7 is a flowchart illustrating document tray elevation control (high resolution mode).
Figure 8:
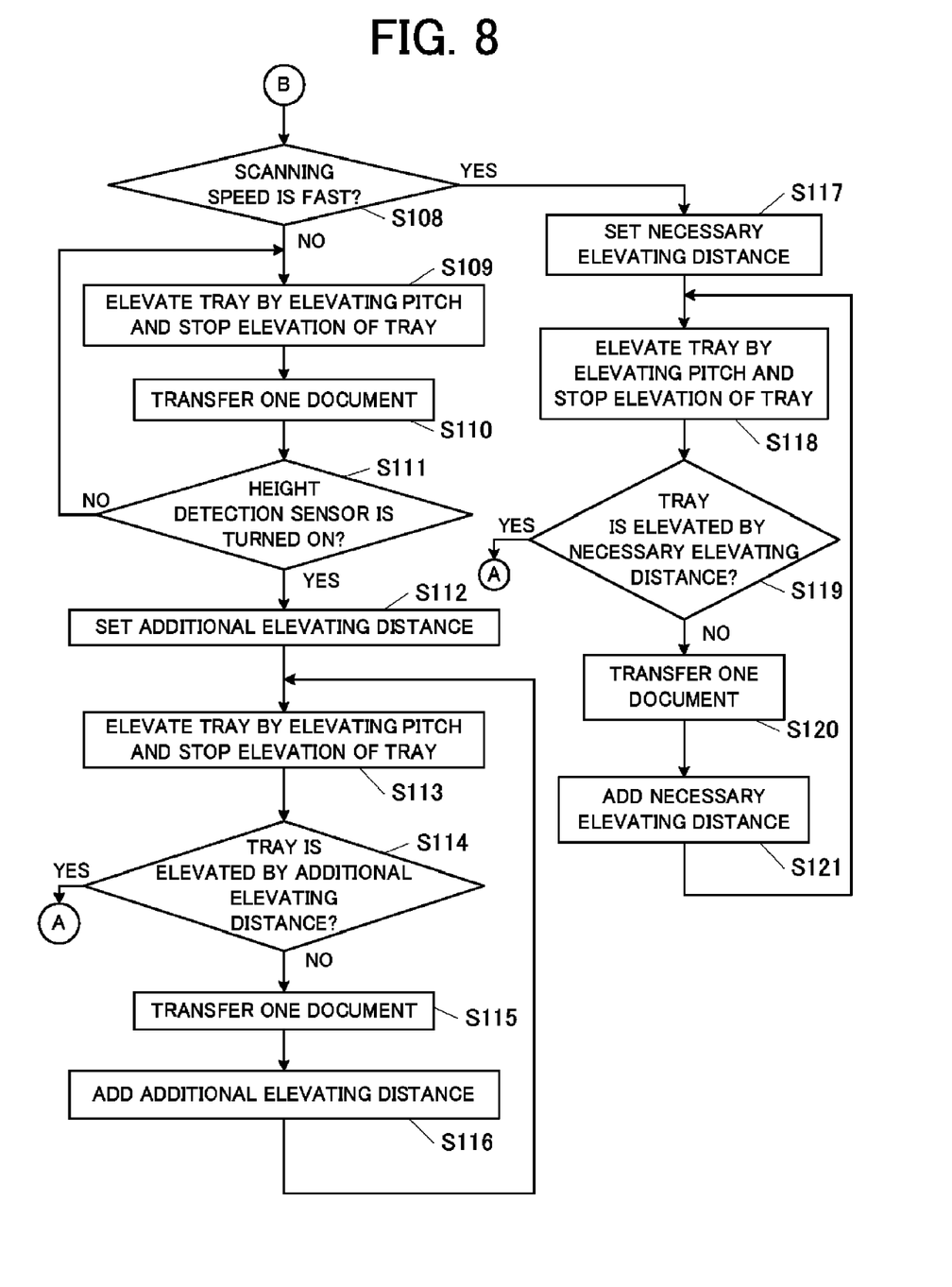
FIG. 8 is a flowchart illustrating document tray elevation control (intermediate resolution mode/low resolution mode).

Preferred embodiments of the present invention will be described below. FIG. 1 is a sectional side view illustrating an entire configuration of an image scanner according to a preferred embodiment of the present invention, and FIG. 2 is a block diagram illustrating a portion of an electronic configuration of the image scanner. FIG. 3 is an enlarged sectional side view illustrating a state in which a transfer unit is driven to transfer a topmost document into a document transportation path. FIG. 4 is an enlarged sectional side view illustrating a state in which a pickup roller is retracted upward immediately before the transfer of the topmost document is completed. FIG. 5 is an enlarged sectional side view illustrating a state in which the transfer is completed to lower the pickup roller again. FIG. 6 is an enlarged sectional side view illustrating a state in which a document tray is elevated. FIGS. 7 and 8 are flowcharts illustrating document tray elevation control.

As illustrated in FIG. 1, an image scanner 10 is an image scanning apparatus according to a preferred embodiment of the present invention. A large capacity document tray 11 in which documents 14 are placed is provided in a lower portion of a main body of the image scanner 10, and a discharge tray 20 in which scanned documents 14 are stacked is provided in an upper portion of the main body of the image scanner 10.

The image scanner 10 includes a document feeding port 41 arranged to feed a document 14 from the document tray 11 to the inside of the main body and a document discharge port 42 arranged to discharge the document 14 to the discharge tray 20 after an image of the document 14 is scanned inside the main body.

A curved document transportation path 21 connecting the document feeding port 41 and the document discharge port 42 is arranged in the main body of the image scanner 10, and transportation rollers 25, 26, 27, 28, and 29 are disposed along the document transportation path 21. Two image sensors 51 and 52 are disposed at a midpoint of the document transportation path 21 so as to face the front and back of the document, and the image sensors 51 and 52 scan the front and back of the document 14 passing through the document transportation path 21. An operation panel 50 is provided on a top portion of the main body of the image scanner 10. Instructions such as document scanning modes (high resolution mode/intermediate resolution mode/low resolution mode), a document scanning speed, and start/stop of image scanning can be provided to the apparatus through the operation panel 50.

The image scanner 10 includes an image scanning unit 46 arranged to scan the document 14 and a document transportation device 47 arranged to transport the document 14. The document transportation device 47 includes the transportation rollers 25 to 29 and an electric motor (driving source, not illustrated) arranged to drive the transportation rollers 25 to 29. The document transportation device 47 transports the document 14 on the document tray 11 from the document feeding port 41 to the image scanning unit 46, and the document transportation device 47 discharges the document 14 from the document discharge port 42 toward the discharge tray 20 after the document 14 passes through the image scanning unit 46.

The image scanner 10 includes the document tray 11 and a transfer unit 48. The transfer unit 48 transfers and separates the documents 14 one by one, and the transfer unit 48 transports the document 14 from the document feeding port 41. The transfer unit 48 includes a pickup roller 22, a separation roller 23, and a retard roller 24. The pickup roller 22 transfers the document 14 to the document feeding port 41 by contacting an upper surface of a topmost document 14 stacked on the document tray 11. The separation roller 23 is disposed on a downstream side of the pickup roller 22 in a document transportation direction. The retard roller 24 is disposed opposite the separation roller 23.

A guide rail (not illustrated) is vertically provided at an appropriate position of the image scanner 10, and a lifting frame 35 is able to be lifted along the guide rail. Because the document tray 11 is attached to the lifting frame 35, the document tray 11 can be vertically moved along with the lifting frame 35.

A lower limit position (illustrated in FIG. 1) of a lifting stroke of the document tray 11 is a document setting position where the documents are placed on the document tray 11. On the other hand, a position (illustrated in FIG. 3) which is located above the document setting position and in which the topmost document 14 can contact the pickup roller 22 is a separation position where the documents 14 can individually be separated by the transfer unit 48 and fed toward the document transportation path 21.

As illustrated in FIG. 1 for example, the document transportation device 47 includes a lifting and lowering device 49 which can lift and lower the document tray 11. The lifting and lowering device 49 includes a tray lifting and lowering motor 15 in the form of an electric motor, a pinion (gear) 13 driven by the tray lifting and lowering motor 15, and a rack 12 engaging the pinion 13. The tray lifting and lowering motor 15 is preferably a stepping motor.

The rack 12 is fixed to the lifting frame 35, and the rack 12 is vertically moved along with the lifting frame 35 and the document tray 11.

The pickup roller 22 is arranged above the document tray 11 so as to face the document tray 11, and the pickup roller 22 is supported while being able to be lifted. The pickup roller 22 is biased downward by a spring (not illustrated) such that the pickup roller 22 can be pressed against the upper surface of the topmost document 14.

A height detection sensor 31 arranged to detect a height of the pickup roller 22 is provided in the transfer unit 48. In the state in which the pickup roller 22 contacts the topmost stacked document 14, the height of the pickup roller 22 can be detected by the height detection sensor 31 to detect the height of the upper surface (upper surface height) of the stacked documents 14.

For example, the height detection sensor 31 may be a photosensor. The height detection sensor 31 is turned on when the height of the pickup roller 22 (upper surface height of the document 14) exceeds a predetermined height, and the height detection sensor 31 is turned off when the height of the pickup roller 22 is lower than the predetermined height. The predetermined height is preferably set to be a height at which the pickup roller 22 is slightly elevated by the upper surface of the topmost document 14. As illustrated in FIG. 2, the height detection sensor 31 is electrically connected to a control unit 60, so that the height detection sensor 31 can transmit a signal of the on/off state to the control unit 60.

As illustrated in FIG. 1, a retracting solenoid 33 is coupled to the pickup roller 22, and the pickup roller 22 can be retracted upward at an appropriate timing and forcibly separated from the upper surface of the document 14. As illustrated in FIG. 2, the retracting solenoid 33 is connected to the control unit 60.

The pickup roller 22, the separation roller 23, and the retard roller 24 are coupled to an electric motor which is the driving source of the document transportation device 47 through an electromagnetic clutch 34. The electromagnetic clutch 34 is electrically connected to the control unit 60.

As illustrated in FIG. 1, a document passing detection sensor 32 including a photosensor is disposed on the downstream side of the separation roller 23 in the document transportation direction. The document passing detection sensor 32 is turned on when detecting the document immediately after the document passes through a nip position between the separation roller 23 and the retard roller 24, and the document passing detection sensor 32 is turned off in other cases. As illustrated in FIG. 2, the document passing detection sensor 32 is electrically connected to the control unit 60.

The image scanner 10 preferably includes a microcomputer type control unit 60. As illustrated in FIG. 2, the tray lifting and lowering motor 15 and the operation panel 50 are electrically connected to the control unit 60.

In the image scanner 10 having the above-described configuration, an operator stacks the overlapped documents 14 on the document tray 11 which is the document setting position as illustrated in FIG. 1, and the operator provides the operation panel 50 (or personal computer) with an instruction to start the scanning, thereby transmitting a scanning start signal to the control unit 60.

When the control unit 60 receives the scanning start signal, the control unit 60 turns off the retracting solenoid 33 to lower the pickup roller 22, and the scanning start signal starts driving the tray lifting and lowering motor 15. Therefore, the tray lifting and lowering motor 15 is driven to rotate the pinion 13, and an upward force acts on the rack 12 engaging the pinion 13. This enables the document tray 11 to be elevated along the guide rail from the document setting position.

The control unit 60 monitors the state of the height detection sensor 31 during the driving of the tray lifting and lowering motor 15. The upper surface of the document 14 elevated by the document tray 11 contacts and elevates the pickup roller 22. The control unit 60 transmits a driving pulse to the tray lifting and lowering motor 15 to elevate the document tray 11 until the pickup roller 22 reaches a predetermined height to turn on the height detection sensor 31. Even after the height detection sensor 31 is turned on, the control unit 60 further drives the tray lifting and lowering motor 15 until the document tray 11 is elevated by a predetermined height. The control unit 60 can control the predetermined height elevation of the document tray 11 by transmitting a predetermined number of driving pulses to the tray lifting and lowering motor 15, which is preferably a stepping motor.

After the document tray 11 is elevated to the separation position shown in FIG. 3, the tray lifting and lowering motor 15 is stopped to immediately start the drive of the transfer unit 48. Specifically, the control unit 60 connects the electromagnetic clutch 34 (FIG. 2) to start the driving of the pickup roller 22, separation roller 23, and retard roller 24. Then, the pickup roller 22 transfers the topmost document 14 as illustrated in FIG. 3, and the document 14 is fed to the document transportation path 21 through the document feeding port 41 while the separation roller 23 and the retard roller 24 separate the documents 14 one by one.

In feeding the document 14, the control unit 60 monitors the state of the document passing detection sensor 32. When the document passing detection sensor 32 detects the topmost document 14 fed to the downstream side by the separation roller 23 and the retard roller 24, the control unit 60 turns on the retracting solenoid 33 to retract the pickup roller 22 upward as illustrated in FIG. 4. Therefore, continuously irregular transfer can be prevented in the previous and subsequent documents 14.

The transportation rollers 25 to 29 (FIG. 1) transport the document 14 through the document transportation path 21, and the image sensors 51 and 52 scan the front and back of the document 14. An appropriate conversion process is performed to the data obtained by the scanning, and the converted data is transmitted through a communication cable (not illustrated) to a personal computer which is a higher order apparatus connected to the image scanner 10. The scanned document 14 is delivered along the document transportation path 21 to the discharge tray 20.

The control unit 60 measures an elapsed time using a timer circuit (not illustrated) since the document passing detection sensor 32 is turned on by detecting the document 14. When a predetermined time elapses, the document 14 passes through the nip portion between the separation roller 23 and the retard roller 24, and the document 14 is assumed to be retained by the transportation roller 25 or the like on the downstream side. Therefore, the control unit 60 releases the connection of the electromagnetic clutch 34 to stop driving the pickup roller 22, separation roller 23, and retard roller 24 as illustrated in FIG. 5. The control unit 60 turns off the retracting solenoid 33 immediately after stopping the drives of the pickup roller 22, separation roller 23, and retard roller 24, and the control unit 60 lowers the pickup roller 22 to bring the pickup roller 22 into contact with the topmost document 14.

Then, the control unit 60 monitors the state of the document passing detection sensor 32. After the transferred document 14 passes through the document passing detection sensor 32, and when a predetermined time elapses since the document passing detection sensor 32 is turned off, the control unit 60 connects the electromagnetic clutch 34 again as illustrated in FIG. 3, and the control unit 60 transfers the next document 14 using the pickup roller 22. While a constant interval is ensured between the document 14 and the subsequent document 14, the documents 14 are supplied one by one to the document transportation path 21 by the repetition of the operations (FIGS. 3 to 5) until all of the documents 14 placed on the document tray 11 are transferred, and the documents 14 can be scanned using the image scanning unit 46.

When the documents 14 on the document tray 11 are sequentially delivered by the transfer unit 48, a remaining amount of documents 14 is gradually decreased, which lowers the upper surface height of the topmost document 14. In the present preferred embodiment, by the following the control of the tray elevation, the state in which the pickup roller 22 can transfer the document 14 is maintained irrespective of the remaining amount of documents 14, and the documents 14 can sequentially be transported until all of the documents 14 placed on the document tray 11 are gone.

The control of the elevation of the document tray 11 will be described in detail with reference to FIGS. 7 and 8. As illustrated in the flowchart of FIG. 7, when the document scanning is started, the document tray 11 is elevated to the separation position as described above, and the one document 14 is transferred (S101). The transfer operation is described above with reference to FIGS. 3 to 5. In the state of FIG. 5, the state of the height detection sensor 31 is checked in each transfer of the one document at a time (hereinafter referred to as "inter-transfer time") until the transfer of the next document is started since the transfer of the previous document is completed (S102 of FIG. 7). In the case where the height detection sensor 31 is turned on, i.e., the upper surface height of the document 14 has not been lowered much, the flow returns to the step S101 to repeat the transfer of the documents 14 one by one.

In the case where the height detection sensor 31 is turned off, a scanning speed at which the operator instructs the image scanner 10 to scan the document is checked in S103. The scanning speed is determined according to the scanning mode instructed by the user using the operation panel 50 or the like. The scanning speed becomes a low speed in the case of the high resolution mode, the scanning speed becomes an intermediate speed in the case of the intermediate resolution mode, and the scanning speed becomes a fast speed in the case of the low resolution mode.

In the case of the high resolution mode (low scanning speed), the tray lifting and lowering motor 15 is immediately driven from the state of FIG. 5 to start the elevation of the document tray 11 (S104 of FIG. 7). The document tray 11 is elevated until the off-state height detection sensor 31 is turned on (S105). Even after the height detection sensor 31 is turned on, the document tray 11 is further elevated to a height that is higher by a predetermined distance (the predetermined number of pulses) than the position where the height detection sensor 31 is initially turned on as illustrated in FIG. 6 (S106 of FIG. 7). When the document tray 11 reaches the height, the tray lifting and lowering motor 15 is stopped to stop the document tray 11 (S107), the flow returns to the step S101 to start the transfer of the next document 14.

That is, in the high resolution mode with the low scanning speed, a certain time can be ensured until the subsequent document 14 is transferred since the transfer of the document 14 is ended. Therefore, through the control of steps S104 to S107, the control unit 60 elevates the document tray 11 at one time to the necessary height during the one inter-transfer time.

On the other hand, when the determination that the scanning mode is not the high resolution mode (scanning speed is not low) is made in S103, it is further checked whether or not the scanning mode is the low resolution mode (high speed scanning mode) (S108). When the determination that the scanning mode is not the low resolution mode is made in S108, the scanning mode is determined to be the intermediate resolution mode (intermediate speed scanning mode), and the control unit 60 carries out the steps from step S109.

In the intermediate resolution mode (intermediate scanning speed), the tray lifting and lowering motor 15 is immediately driven from the state of FIG. 5. However, the elevating distance is a distance corresponding to the predetermined number of pulses of the tray lifting and lowering motor 15 regardless of the position of the document tray 11 (S109). Hereinafter, the elevating distance is referred to as "elevating pitch".

The elevating pitch is determined such that the elevating pitch is smaller than a distance in which the document tray 11 is elevated in one step or all at one time by the control described in steps S104 to S107 while the elevating pitch is larger than a thickness of one document 14. The elevating pitch is also determined such that the elevating pitch is shortened in the case where the instruction of the high speed scanning is given in the intermediate resolution mode, otherwise the elevating pitch is relatively lengthened.

After the document tray 11 is elevated by the elevating pitch in step S109, the transfer unit 48 transfers the one document in step S110. Because the amount of elevation of the document tray 11 in the step S109 is the elevating pitch, the document tray 11 can securely be elevated and stopped even in the short inter-transfer time until the subsequent document 14 is further transferred since the document 14 is transferred at the intermediate speed scanning. Accordingly, because the subsequent document 14 can be transferred while the document tray 11 is completely stopped (S110), the fluctuation in document transportation can be avoided in scanning the document 14 to prevent the deterioration of the scanning image quality.

After the one document 14 is transferred in step S110, the state of the height detection sensor 31 is checked (S111). When the height detection sensor 31 is turned off, the flow returns to the step S109 to repeat the elevation of the document tray 11 by the elevating pitch and the transfer of the document (S109 and S110).

As described above, when the document 14 is transferred once (S109 to S111), the stacked height of the documents 14 is decreased by the thickness of one sheet of the documents 14, and the document tray 11 is elevated by the elevating pitch larger than the thickness of one sheet of the documents 14. Accordingly, when the transfer of the document 14 is repeated, the upper surface height of the topmost document 14 is gradually elevated. When the pickup roller 22 is elevated by elevating the upper surface height of the topmost document 14 to turn on the height detection sensor 31, the flow leaves the loop of S109 to S111 to go to steps from S112.

In step S112, a distance (additional elevating distance) in which the document tray 11 should be additionally elevated since the height detection sensor 31 is turned on is firstly set, and the additional elevating distance is stored in a memory. An initial value of the additional elevating distance is equal to a distance (target elevating distance) in which the upper surface height of the document 14 should further be elevated since the height detection sensor 31 is turned on. The additional elevating distance is also set equal to the predetermined distance in which the document tray 11 is elevated by the control of step S106 in the low speed scanning.

Then, the tray lifting and lowering motor 15 is driven to elevate the document tray 11 by the elevating pitch, and the document tray 11 is stopped (S113). Similarly to the step S109, the document tray 11 is elevated and stopped during the short inter-transfer time until the subsequent document 14 is further transferred since the document 14 is transferred at the intermediate speed scanning. The elevating pitch is the same distance as that of step S109.

The total distance in which the document tray 11 is elevated since the time of S111 is computed, and it is checked whether or not the obtained total distance reaches the additional elevating distance (S114). When the total distance does not reach the additional elevating distance, the one subsequent document 14 is transferred (S115). The distance corresponding to the thickness of the one document 14 is added to the additional elevating distance and the result is restored in the memory (S116). Then the flow returns to the step S113.

The document tray 11 is elevated at elevating pitches in each transfer of the one document 14 by the loop of steps S113 to S116, and the thickness of the one document is added to the additional elevating distance. This corresponds to re-computation of the additional elevating distance of the document tray 11 in consideration of the decrease in the upper surface height by the transfer of the document 14. While the additional elevating distance is re-computed every time the document is transferred and the document tray is elevated, it is determined whether or not the total elevating distance of the document tray 11 reaches the additional elevating distance (S114). When the total elevating distance of the document tray 11 reaches the additional elevating distance in step S114, because the upper surface height of the document 14 is substantially elevated by the target elevating distance, the flow leaves the loop to return to the step S101 of FIG. 7, and the document 14 is transferred again while the document tray 11 is stopped.

On the other hand, when the determination that the scanning mode is the low resolution mode (high speed scanning mode) is made in step S108, the control unit 60 makes a transition to the steps from S117 (FIG. 8). As illustrated in FIG. 8, in the low resolution mode, initially a necessary elevating distance is set and stored in a memory (S117).

The necessary elevating distance is a distance in which the document tray 11 should be lifted in order to cause the upper surface height of the topmost document 14 to reach the target height since the height detection sensor 31 is turned off. The initial value of the necessary elevating distance becomes equal to the total distance in which the document tray 11 is lifted in the steps S104 to S107 of FIG. 7 during the reading in the high resolution mode.

Then, in the inter-transfer time of the document 14, the tray lifting and lowering motor 15 is driven to elevate the document tray 11 by the elevating pitch, and the document tray 11 is stopped (S118).

The total distance in which the document tray 11 is elevated since the time of S117 is computed to check whether or not the obtained total distance reaches the necessary elevating distance (S119). When the total distance does not reach the necessary elevating distance, the one subsequent document 14 is transferred (S120). Then, a distance corresponding to a thickness of the one document 14 is added to the additional elevating distance and restored in the memory (S121), and the flow returns to the step S118.

The document tray 11 is elevated by the elevating pitch in each transfer of the one document 14 by the loop of S118 to S121, and the thickness of the one document 14 is added to the additional elevating distance. Similarly to the loop of S113 to S116, this corresponds to re-computation of the additional elevating distance of the document tray 11 in consideration of the decrease in the upper surface height by the transfer of the document 14.

In S119, when the total elevating distance reaches the necessary elevating distance, because the upper surface height of the document 14 is substantially elevated to the target height, the flow leaves the loop to return to the step S101, and the document 14 is transferred again while the document tray 11 is stopped.

That is, in the low resolution mode with the high scanning speed, the vibration associated with the high speed conveyance of the document 14 becomes significant, and the height detection sensor 31 detects the vibration and flutter of the pickup roller 22, which possibly mistakenly detects the upper surface height of the document 14. On the contrary, in the steps (S118 to S121) in the low resolution mode of the present preferred embodiment, the control is performed such that the elevation of the document tray 11 is completed at the time when the document tray 11 (upper surface height of the document 14) is elevated by the predetermined necessary elevating distance irrespective of the state of the height detection sensor 31. Accordingly, the upper surface height of the document 14 can stably be elevated to a proper height with no influence of the vibration and flutter of the pickup roller 22.

Thus, the image scanner 10 of the present preferred embodiment includes the document tray 11 on which the plural overlapped documents 14 are placed, the image scanning unit 46 arranged to scan the documents 14, the transfer unit 48 arranged to transfer the documents 14 on the document tray 11 one by one toward the image scanning unit 46, the lifting and lowering device 49 arranged to lift and lower the document tray 11, the height detection sensor 31 arranged to detect the upper surface height of the documents 14 stacked on the document tray 11, and the control unit 60 arranged to control the lifting and lowering device 49.

The control unit 60 can control the lifting and lowering device 49 while switching the document scanning speed between a first control mode in which the document is scanned at an intermediate speed (intermediate resolution mode) and a second control mode in which the document is scanned at a high speed (low resolution mode).

The transfer unit 48 transfers the document 14 to lower the upper surface height of the topmost document 14, and the height detection sensor 31 is turned off, whereby the control unit 60 performs different steps depending on the first control mode or the second control mode (S108 of FIG. 8).

Specifically, in the intermediate speed scanning of the document (intermediate resolution mode, i.e., first control mode), until the upper surface height further reaches the target height that is higher by a predetermined distance since the height detection sensor 31 is turned on, the document tray 11 is elevated at predetermined elevating pitches during the inter-transfer time each time the one document 14 is transferred (S109 to S116).

On the other hand, in the high speed scanning of the document (low resolution mode, i.e., second control mode), until the upper surface height reaches the height that is higher by a predetermined distance than the upper surface height at the time when the height detection sensor 31 is turned on, the document tray 11 is elevated at predetermined elevating pitches during the inter-transfer time each time the one document 14 is transferred (S117 to S121).

Therefore, in both the intermediate speed scanning of the document (first control mode) and the high speed scanning of the document (second control mode), the document tray 11 is elevated during the inter-transfer time of the document 14. Accordingly, in scanning the image with the image scanning unit 46, the document tray 11 is kept stationary to prevent the scanning image quality deterioration caused by the fluctuation in transportation of the document 14. In both the first control mode and the second control mode, the document tray 11 is not elevated at one time, but the document tray 11 is elevated at relatively short predetermined elevating pitches (little by little), so that the document tray 11 can naturally be elevated during the short inter-transfer time without interrupting the transfer of the document. In the high speed scanning of the document (second control mode), the document tray 11 is elevated by the predetermined distance irrespective of the state of the height detection sensor 31 in elevating the document tray 11, so that the upper surface height of the document 14 can stably be elevated to a proper height with no influence of the error detection of the height detection sensor 31, which is caused by the vibrations associated with the high speed scanning.

In the present preferred embodiment, the control unit 60 can control the lifting and lowering device 49 in a third control mode in which the document is scanned at a low speed (high resolution mode). In the low speed scanning (high resolution mode, i.e., third control mode), when the height detection sensor 31 is turned off, the document tray 11 is elevated at one time during the inter-transfer time until the upper surface height reaches the height (target height) that is higher by a predetermined distance than the height at the time when the height detection sensor 31 is initially turned on (S104 to S107).

Therefore, in the low speed scanning of the document, the upper surface height of the topmost document 14 can accurately be elevated to the suitable height based on the state of the height detection sensor 31. Because the document tray 11 is elevated at one time by utilizing the inter-transfer time, it is not necessary to interrupt the reading of the document 14, and the reading efficiency is improved.

In the intermediate speed scanning of the document (intermediate resolution mode, i.e., first control mode), when the height detection sensor 31 is turned off, the control unit 60 elevates the document tray 11 at predetermined pitches during the inter-transfer each time the one document 14 is transferred until the height detection sensor 31 is turned on (S109 to S111). When the height detection sensor 31 is turned on, the control unit 60 elevates the document tray 11 by the elevating pitch during the inter-transfer time each time the one document 14 is transferred until the upper surface height is elevated by the predetermined distance (target elevating distance (S113). In the determination as to whether or not the elevation of the document tray 11 by the elevating pitch is ended (S114), the determination is not made only based on whether or not the document tray 11 is elevated by the target elevating distance, but the determination is also made based on whether or not the upper surface height is substantially elevated by the target elevating distance in consideration of the decrease in the upper surface height caused by the transfer of the document (S116).

Therefore, in the intermediate resolution mode, even if the document tray 11 is elevated little by little in each transfer of the document 14, the topmost document 14 can substantially be elevated to the target height in consideration of the decrease in the upper surface height caused by the transfer of the document. As a result, the document 14 can smoothly be transferred using the pickup roller 22.

In the high speed scanning of the document (low resolution mode, i.e., second control mode), when the height detection sensor 31 is turned off, the control unit 60 elevates the document tray 11 at predetermined pitches during the inter-transfer time each time the one document 14 is transferred until the upper surface height is elevated by the predetermined necessary elevating distance. In the determination as to whether or not the upper surface height is elevated by the necessary elevating distance, the determination is not made only based on whether or not the document tray 11 is elevated by the necessary elevating distance, but the determination is also made based on whether or not the upper surface height is substantially elevated by the necessary elevating distance in consideration of the decrease in the upper surface height caused by the transfer of the document.

Therefore, in the low resolution mode, even if the document tray 11 is elevated little by little in each transfer of the document 14, the topmost document 14 can substantially be elevated to the target height in consideration of the decrease in the upper surface height caused by the transfer of the document. As a result, the document 14 can smoothly be transferred using the pickup roller 22.

In the steps S109 and S113 during the intermediate resolution mode, and in the step S118 during the low resolution mode, the elevating pitch of the document tray 11 is shortened as the scanning speed of the document 14 is increased.

Therefore, even if the inter-transfer time is shortened as the scanning speed of the document 14 is increased, the elevating pitch is also shortened with the shortening of the inter-transfer time, so that the document tray 11 can naturally be elevated little by little.

In the present preferred embodiment, the tray lifting and lowering motor 15 which is the driving source of the lifting and lowering device 49 is provided independently of the driving source of the document transportation device 47. However, the tray lifting and lowering motor may commonly be used for the electric motor of the driving source of the document transportation device 47. In this configuration, the electric motor of the document transportation device 47 and the pinion 13 are connected by well a known clutch (for example, an electromagnetic clutch).

In this case, the simple configuration, cost reduction, weight reduction, and downsizing of the image scanner are realized. Because the document tray 11 is elevated during the inter-transfer time, a proper balance can be achieved between the transportation of the document 14 and the elevation of the document tray 11 by switching the power transmission destination of the one electric motor between the period of the transfer of the document 14 and the period of the elevation of the document tray 11.

Thus, the present preferred embodiment and the modifications thereof of the present invention are described above. Furthermore, the above configurations can be changed as follows.

In the present preferred embodiment, in the step S116 of the flowchart (FIG. 8), the setting of the document tray 11 is preferably performed again by adding the distance corresponding to the thickness of the one document to the additional elevating distance. Alternatively, the distance corresponding to the thickness of the one document may be subtracted from the total elevating distance of the document tray 11 in each transfer of one document. Similarly, instead of the step S121, a predetermined distance may be subtracted from the total elevating distance of the document tray 11.

The height detection sensor 31 is not limited to a sensor which is turned on as long as the pickup roller 22 is not lower than the predetermined height, but a sensor which is turned off as long as the pickup roller 22 is not lower than the predetermined height may be used as the height detection sensor 31.

In the height detection sensor 31, the upper surface height of the topmost document 14 is preferably indirectly detected by detecting the height of the pickup roller 22. Alternatively, the upper surface height of the topmost document 14 may directly be detected.

The tray lifting and lowering motor 15 is not limited to a stepping motor, but the tray lifting and lowering motor 15 may be a servo motor.

The configuration in which the document tray is elevated is not limited to the image scanner in which the document transportation path 21 is formed in a curved shape (C-shape) as shown in FIG. 1. For example, the configuration in which the document tray is elevated can be applied to an image scanner, in which a horizontal document transportation path is provided and the document is fed from one side of the apparatus and discharged to the opposite side. The present invention is not limited to the image scanner, but can be applied to an automatic document feeder type copying machine including a large capacity document tray.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. An image scanning apparatus comprising:
    a document tray arranged to receive a plurality of documents;
    an image scanning unit arranged to scan the documents;
    a transfer unit arranged to transfer the documents on the document tray one by one toward the image scanning unit;
    a lifting and lowering device arranged to lift and lower the document tray;
    a height detection sensor arranged to detect an upper surface height of the documents stacked on the document tray; and
    a control unit arranged to control the lifting and lowering device; wherein
    the control unit controls the lifting and lowering device while switching between a first control mode and a second control mode in which a document scanning speed of the second control mode is faster than that of the first control mode; and
    when the height detection sensor detects that the upper surface height becomes lower than a predetermined height due to a transfer of the document by the transfer unit:
    in the first control mode, until the upper surface height reaches a target height that is higher by a predetermined distance than when the height detection sensor detects that the upper surface height becomes higher than the predetermined height, the control unit elevates the document tray at predetermined pitches each time the one document is transferred during an inter-transfer time between completion of the document transfer and start of a subsequent document transfer; and
    in the second control mode, until the upper surface height reaches a height that is higher by a predetermined distance than a height at a time when the height detection sensor detects that the upper surface height becomes higher than the predetermined height, the control unit elevates the document tray at predetermined pitches during the inter-transfer time each time the one document is transferred.

2. The image scanning apparatus according to claim 1, wherein the control unit controls the lifting and lowering device in a third control mode in which the document scanning speed is slower than that of the first control mode; and when the height detection sensor detects that the upper surface height becomes lower than the predetermined height due to the transfer of the document by the transfer unit:

in the third control mode, the control unit elevates the document tray during the inter-transfer time until the upper surface height of the document reaches the target height.

3. The image scanning apparatus according to claim 2, wherein, when the height detection sensor detects that the upper surface height becomes lower than the predetermined height due to the transfer of the document by the transfer unit:

in the first control mode, the control unit elevates the document tray at predetermined pitches during the inter-transfer time each time the one document is transferred until the height detection sensor detects that the upper surface height becomes not lower than the predetermined height;

when the height detection sensor detects that the upper surface height becomes not lower than the predetermined height, the control unit elevates the document tray at predetermined pitches during the inter-transfer time each time the one document is transferred until the upper surface height is further elevated by a predetermined target elevating distance; and a determination of whether or not the upper surface height is elevated by the target elevating distance is made in consideration of a decrease in the upper surface height due to the transfer of the document.

4. The image scanning apparatus according to claim 3, wherein, when the height detection sensor detects that the upper surface height becomes lower than the predetermined height due to the transfer of the document by the transfer unit:

in the second control mode, the control unit elevates the document tray at predetermined pitches during the inter-transfer time each time the one document is transferred until the upper surface height is elevated by a necessary elevating distance; and a determination of whether or not the upper surface height is elevated by the necessary elevating distance is made in consideration of a decrease in the upper surface height due to the transfer of the document.

5. The image scanning apparatus according to claim 4, wherein the predetermined pitch in at least one of the first control mode and the second control mode is shortened as a transfer speed of the document by the transfer unit is increased.

6. The image scanning apparatus according to claim 5, further comprising a document transportation device arranged to transport the document to the image scanning unit, and a driving source shared by the lifting and lowering device and the document transportation device.

7. An image scanner including the image scanning apparatus according to claim 6.

* * * * *